United States Patent [19]
Gotthelf

[11] Patent Number: 5,443,083
[45] Date of Patent: Aug. 22, 1995

[54] PRESSURE-REDUCING REGULATOR FOR COMPRESSED NATURAL GAS

[75] Inventor: Jeffrey B. Gotthelf, Charleston, S.C.

[73] Assignee: ITT Corporation, New York, N.Y.

[21] Appl. No.: 230,587

[22] Filed: Apr. 21, 1994

Related U.S. Application Data

[60] Continuation-in-part of Ser. No. 143,010, Oct. 26, 1993, Pat. No. 5,381,819, which is a division of Ser. No. 16,376, Feb. 11, 1993, Pat. No. 5,285,810.

[51] Int. Cl.⁶ .................................................. G05D 16/02
[52] U.S. Cl. ................................. 137/484.8; 137/340; 137/549; 137/505.37
[58] Field of Search ............... 137/505.36, 505.37, 137/340, 375, 484.8, 549

[56] References Cited

U.S. PATENT DOCUMENTS

| | | |
|---|---|---|
| 1,637,764 | 8/1927 | Coles . |
| 1,646,640 | 10/1927 | Daniel ........................ 137/484.8 X |
| 1,691,758 | 1/1928 | Fausek et al. . |
| 2,069,808 | 2/1937 | Andersson . |
| 2,103,576 | 12/1937 | Dockson . |
| 2,105,876 | 1/1938 | Birch . |
| 2,696,714 | 12/1954 | Hughes ........................... 137/340 |
| 2,707,966 | 5/1955 | Taplin ....................... 137/484.8 X |
| 2,731,975 | 1/1956 | Boals . |
| 2,794,321 | 6/1957 | Warner et al. . |
| 2,896,658 | 7/1959 | Jones ............................... 137/340 |
| 2,967,536 | 1/1961 | Stratman ................... 137/484.8 X |
| 3,120,377 | 2/1964 | Lipschultz et al. . |
| 3,184,295 | 5/1965 | Baverstock . |
| 3,576,193 | 4/1971 | Rothfuss et al. . |
| 3,643,683 | 2/1972 | Semon ............................ 137/484.8 |
| 3,712,333 | 1/1973 | Semon . |
| 4,719,940 | 1/1988 | Beavers ......................... 137/505.39 |
| 4,887,639 | 12/1989 | Lewis et al. . |
| 4,946,047 | 8/1990 | Kurokawa et al. .......... 137/549 X |

FOREIGN PATENT DOCUMENTS

| | | |
|---|---|---|
| 0354427 | 2/1990 | European Pat. Off. . |
| 0507371 | 10/1992 | European Pat. Off. . |
| 517057 | 2/1931 | Germany ....................... 137/484.8 |
| 1951869 | 4/1970 | Germany . |
| 2442023 | 9/1974 | Germany . |
| 7911760 | 12/1979 | Germany . |

OTHER PUBLICATIONS

Type P. NGV Regulators & Enviro-Caps (2 sheets), no date.
Meco-Yoke Type Regulators (1 sheet), no date.

Primary Examiner—Stephen M. Hepperle
Attorney, Agent, or Firm—Menotti J. Lombardi

[57] ABSTRACT

The valving element is positively tied to a pressure-sensing and -responsive diaphragm, via a diaphragm-carried insert. The connection is so arranged as to permit relative angular displacement, between the valving element and the diaphragm, so that cocking of the element, in its axial movement, will not occur. The gas filter is formed of a sintered plastic to avoid corrosion and flaking off of metallic particles. An aspirator hole communicates the diaphragm with the low-pressure chamber outlet, but has an artificially lower pressure, than the outlet pressure, introduced to the diaphragm, through the use of an ejector nozzle. A hole formed in the bonnet establishes atmospheric pressure above the diaphragm, but a porous plug in the hole prevents any ingestion of water, from puddle-splashing, take up from wet roads, and the like.

11 Claims, 7 Drawing Sheets

PRESSURE-REDUCING REGULATOR FOR COMPRESSED NATURAL GAS

This application is a continuation-in-part of application Ser. No. 08/143,010, filed on 26 Oct., 1993, now U.S. Pat. No. 5,381,819, for a Pressure-Reducing Regulator for Compressed, Natural Gas, the latter being a divisional application of parent application Ser. No. 08/016,376, filed on Feb. 11, 1993 now U.S. Pat. No. 5,285,810.

BACKGROUND OF THE INVENTION

This invention pertains to regulators for safely reducing high pressure natural gas to pressure levels which are usable in vehicular engines. There is a need for automobile manufacturers to provide an alternative fuels capability in a percentage of their vehicles in this decade. Concomitantly, then, there is a need for a pressure-reducing regulator which can accommodate a high pressure natural gas, which will be stored in vehicular storage tanks, and reduce it down to usable pressure levels, to facilitate the production of alternative fuels vehicles.

Prior art regulators commonly incorporate a metallic filter, interposed between the gas inlet and outlet, for entrapping particulate matter. However, such filters are susceptible to corrosion, and can introduce fine metal particles, dislodged from the filter and/or its accommodating housing, during installation and servicing thereof. Too, prior regulator designs provide an atmospheric reference port, for the regulator's pressure-sensing component which, however, admits water-splash therethrough, from puddles, wet roads, and the like, which can damage the regulator. Known regulators couple a translating control valve to a compliant diaphragm, the latter being provided to sense a relevant pressure and to move the valve accordingly. Coupling therebetween, for being relatively rigid, causes the valving element to jam, and get stuck, when the diaphragm tilts slightly.

It is the purpose of this invention to set forth a pressure-reducing regulator, for compressed natural gas, which avoids the aforedescribed shortcomings of known designs, is usable in vehicular applications, and is of thoughtfully efficient and uncomplicated structure.

SUMMARY OF THE INVENTION

It is an object of this invention to disclose a pressure-reducing regulator for compressed natural gas comprising a regulator housing; wherein said housing has a body; said body as (a) an inner chamber for receiving high-pressure, compressed, natural gas therewithin, and (b) an outer chamber for receiving low-pressure, compressed, natural gas therewithin; first porting means for admitting gas into said inner chamber; second porting means for discharging gas from said outer chamber; valving means, movably disposed within said body, for controlling flow between said cheers; compliant means, coupled to said valving means, for (a) sensing gas pressure in one of said chambers, and (b) effecting movement of said valving means; and non-metallic filtering means, interposed between said porting means, for filtering out particulate matter from inter-chamber gas flow.

It is also an object of this invention to set forth a pressure-reducing regulator for compressed natural gas comprising a regulator housing; wherein said housing has a body; said body has (a) an inner chamber for receiving high-pressure, compressed natural gas therewithin, at a given pressure, and (b) an outer chamber for receiving low-pressure, compressed, natural gas therewithin, at a given low pressure; first porting means for admitting gas into said inner chamber; second porting means for discharging gas, at said given low pressure, from said outer chamber; valving means movably disposed within said body, for controlling gas flow between said chambers; compliant means, coupled to said valving means, for (a) sensing gas pressure in one of said chambers, and (b) effecting movement of said valving means; and means for communicating said compliant means with said second porting means, and introducing gas pressure to said compliant means at less than said given low pressure.

It is a further object of this invention to define a pressure-reducing regulator for compressed natural gas comprising a regulator housing; wherein said housing has a body; said body has (a) an inner chamber for receiving high-pressure, compressed, natural gas therewithin, and (b) an outer chamber for receiving low-pressure, compressed, natural gas therewithin; first porting means for admitting gas into said inner chamber; second porting means for discharging gas from said outer cheer; valving means, movably disposed within said body, for controlling gas flow between said chambers; compliant means, coupled to said valving means, for sensing gas pressure in one of said chambers, and (b) effecting movement of said valving means; and said valving means and said compliant means have means cooperative for accommodating relative angular displacement therebetween.

Further objects of this invention, as well as the novel features thereof, will become apparent by reference to the following description, taken in conjunction with the accompanying figures.

A BRIEF DESCRIPTION OF THE DRAWINGS

DESCRIPTION OF THE EMBODIMENTS OF THE PRIOR, RELATED APPLICATIONS

By way of background information, to provide an understanding of the general construction and functioning of the subject regulators, a description of the embodiments thereof, as set out in the cited, prior and related patent applications follows.

Figure 1:
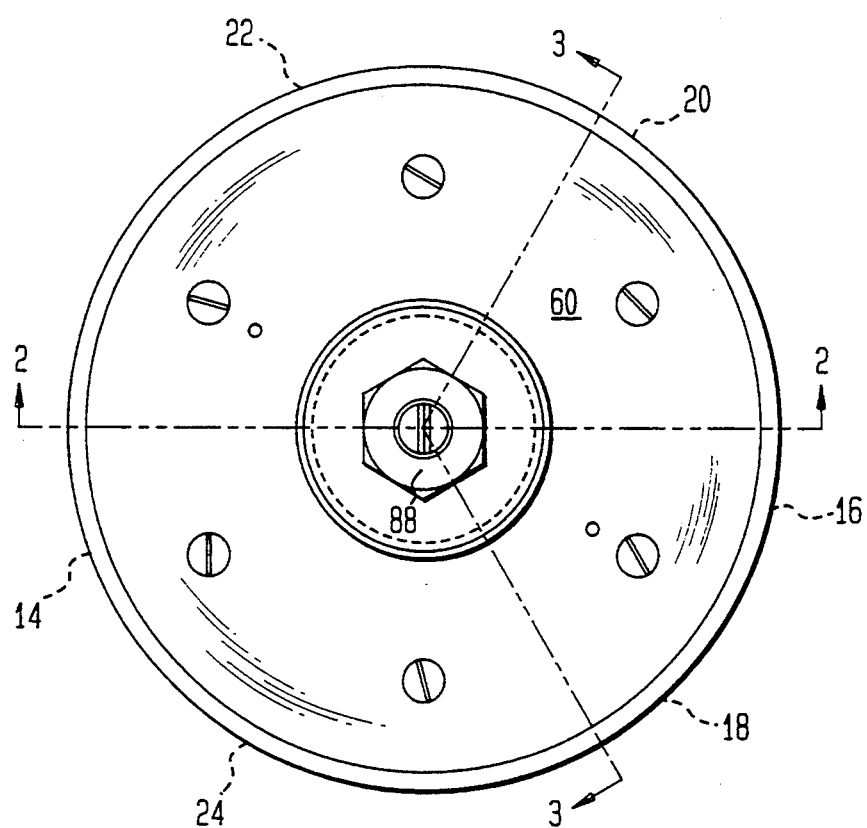
FIG. 1 is a plan or top view of the regulator, according to an embodiment thereof, as disclosed in the cited, prior applications.

The novel regulator 10, according to an embodiment thereof, has a regulator body 12 in which are formed six connection ports (only four of which are shown). Ports 14 and 16 accommodate for the inlet and discharge, respectively, of a heating fluid. Ports 18 and 20 accommodate for the admittance of high-pressure natural gas, and discharge of low-pressure gas, respectively. Two further ports 22 and 24, indicated by the dashed lines in FIG. 1, not seen, are provided for an inlet gauge and an outlet gauge or relief valve, respectively, according to a practice well known in this art.

The regulator body 12 has a central void 26 which is threaded partly therealong. The void threadedly receives therein a control valve body 28. Body 28 has a cylindrical bore 30 formed therein with an annular recess 32 formed in an outer termination of the bore 30. An apertured valve seat 34 is set in the recess 32. Control valve body 28 further has an outer, annular, reduced diameter portion 36 about which is positioned a cylindrical filter 38. Bore 30 opens onto a channel 40 formed in the body 12, and at the opposite end thereof, terminates in a cylindrical recess 42. A valving element 44, having a tapered-nose head 46 and an elongate shank 48, is confined within bore 30; the shank 48 is received at an end thereof in the recess 42, and the leading end of the head 46 is received in the valve seat 34.

An uppermost portion of the regulator body 12 has a circular recess 50 formed therein which, centrally thereof, is in fluid communication with the channel 40. Integral with the head 46 is a slender stem 52. The stem 52 protrudes through the channel 40 and the recess 50. The shank 48, head 46 and stem have a continuous passage 54 formed therein and therethrough. The passage 54 opens at one end thereof onto the recess 50, and at the other end onto the shank-receiving recess 42. About the lower portion of the shank 48 is disposed an O-ring seal 55. A rimmed plate 56, centrally apertured, is set atop the O-ring seal 55. Plate 56 comprises a bearing surface for an end of a compression spring 58 which is circumjacent the shank 48; the opposite end of the spring 58 is set against an underlying annular shoulder of head 46.

A hollow bonnet 60, having a radially-extending flange 62 is bolted, via the flange 62, to the uppermost portion of the regulator body 12. A diaphragm 64 is clamped, by means of its outer periphery, between the flange 62 and the body 12.

The diaphragm 64 is centrally apertured, and receives therethrough an insert 66. Insert 66 has a circular, plate-like portion 68 which underlies the diaphragm, and a threaded stub 70 which extends above the diaphragm 64. The diaphragm plate 72 is set about the stub 70 and a lock nut 74 is made fast on the stub and against the plate 72. The insert 66 has a threaded bore 76 formed therein, and receives therein the threaded end 78 of stem 52. A compression spring 80 is set, at one end thereof, about the nut 74 and upon plate 72. The opposite end of the spring 80 receives therein a button 82. An adjustment screw 84, which protrudes through the uppermost end of the bonnet 60, and is threadedly engaged with a threaded bore 86 thereat, bears against the button 82, and externally of the bonnet 60 receives a jam nut 88. Portion 68 of the insert 66 has a groove 90 formed therein which extends fully thereacross.

A centrally-bored bowl 92 is made fast to an underside of the regulator body 12. The body 12 has a threaded bore 94 formed in the underlying portion thereof to receive therein the headed bolt 96 which secures the bowl 92 in place. Channels 98 and 100 formed in the body are in open communication with the ports 14 and 16. Consequently, then, a heating fluid, such as vehicular coolant, being admitted via port 14 will course through channel 98, to pool in the bowl 92, and exit via channel 100 and port 16. The depth of the bowl is such that heating fluid conducted thereto can heat exchange, directly, with the control valve body 28, and that portion of the regulator body 12 in which are confined the filter 38 and valving element 44 has the fluid addressed to opposite sides thereof and thereabout. Consequently, icing of the regulator 10 is prevented.

Figure 4:
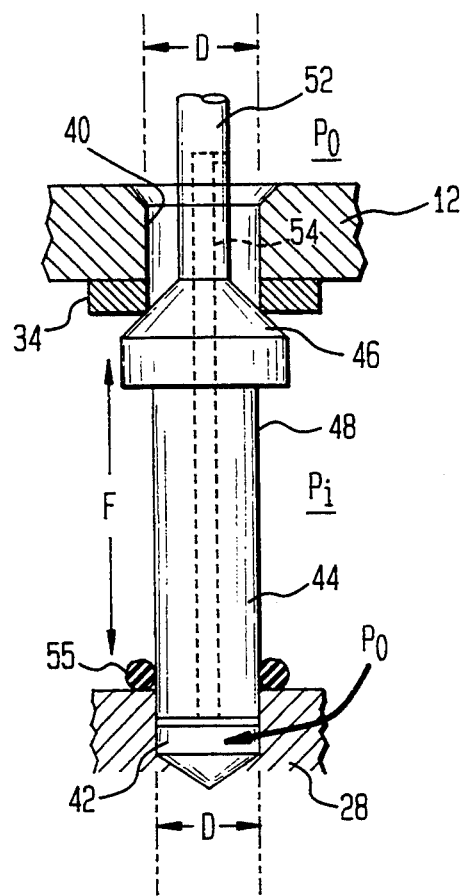
FIG. 4 is an illustration of a portion of the regulator of FIGS. 1-3, showing the valve seat and valving element, the same representing the pressures and forces acting across the element; this figure too is slightly enlarged over the scale of FIGS. 2 and 3.

The diaphragm 64 forms one wall which closes off the recess 50, and this forms an outer cheer of the recess, and the amount of void 26 in the regulator body 12 which is not occupied defines an inner cheer thereof. The high pressure natural gas enters the inner chamber, i.e., void 26, via the port 18, and passes through the filter 38. Herein, the gas is metered by the balanced valving element 44. With particular reference to FIG. 4, the balancing of the element 44 can be readily understood. The seating area between the head 46 of the valving element 44 and the valve set 34 defines a first boundary between the inlet gas pressure, in the inner chamber of void 26, and the outlet gas pressure in the outer chamber of recess 50. The gas pressure differential thereat creates an upwardly directed force, the magnitude of which varies proportionally with the differential pressure. The passage 54 in the valving element 44 communicates the outlet gas pressure in the outer chamber of recess 50 to a volume obtaining beneath the valving element 44 in the recess 42. Consequently, a second boundary between the inlet pressure, in the inner chamber of void 26, and the outlet pressure in the recess 42, is defined between the shank 48 and the O-ring seal 55. The gas pressure differential thereat creates a downwardly directed force, the magnitude of which varies proportionally with the differential pressure. In FIG. 4, the locus of the inlet pressure is represented by "Pi", and that of the outlet pressure is represented by "Po". The two, aforesaid boundary areas, one where the head 46 engages the seat 34, and the other, the sealing area between the shank 48 and the O-ring seal 55, are of the same diameter "D". As a consequence, the oppositely directed forces "F" are equalized in magnitude. Too, regardless of how the inlet pressure "Pi" and/or the outlet pressure "Po" varies, the forces and magnitude of the differential pressures, at the two boundary areas, will be maintained in balanced opposition.

The spring 58 provides an upward force to move the valving element 44 upwardly, when no other forces are present. Additionally, the spring 58 applies a biasing force on the rimmed plate 56. The plate 56 maintains the geometry of the O-ring seal 55 so that the latter can positively seal against the shank 48.

As earlier noted, portion 68 of the diaphragm insert 66 has the groove 90 formed therein and fully thereacross. This feature permits gas flow, via the groove 90, even when the diaphragm has bottomed against the uppermost surface of the regulator body 12. This is especially beneficial in a using vehicle which has a compressed natural gas system with a supply shut off. The groove 90 insures an instant outlet pressure availability when the system supply is turned on.

To operate the regulator 10 and set the outlet pressure, the end user turns the adjustment screw 84 to move the button 82 downwardly. This compresses the spring 80 which forces the diaphragm 64 downwardly. Such movement of the diaphragm 64 concomitantly moves the valving element 44 downwardly. Resultantly, the head 46 removes from the valve seat 34 to open communication between the inner chamber of void 26 and the outer chamber of recess 50. As the inlet pressure is much greater than the outlet pressure, gas flow will occur, and the outlet pressure will increase. The outlet pressure acts against the surface of the diaphragm 64, exerting an upward force opposing the bias of the spring 80, to effect an equilibrium. If the spring force increases, the outlet pressure will increase to maintain the equilibrium. Too, if the inlet pressure diminishes, as when the pressure in the supply cylinder decreases, the aforesaid equilibrium will remain unchanged; this is due to the aforedescribed balanced valving feature. This is a novel advantage which allows just a single regulator 10 of this design to meet the needs of a compressed natural gas vehicle.

Figure 2:
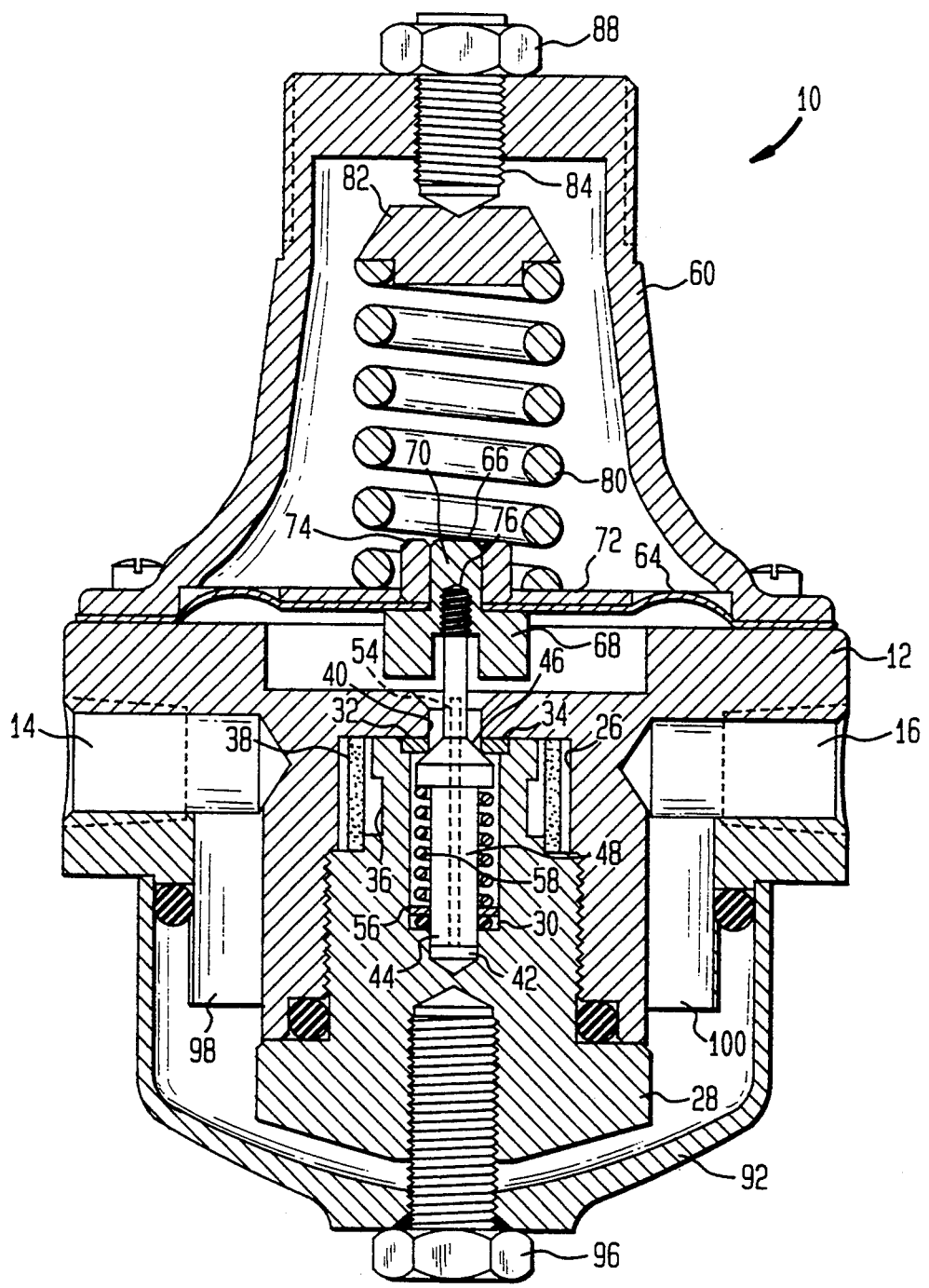
FIG. 2 is a cross-sectional view of the regulator of FIG. 1, taken along section 2—2 of FIG. 1, the scale of FIG. 2 being slightly enlarged over the scale of FIG. 1.
Figure 3:
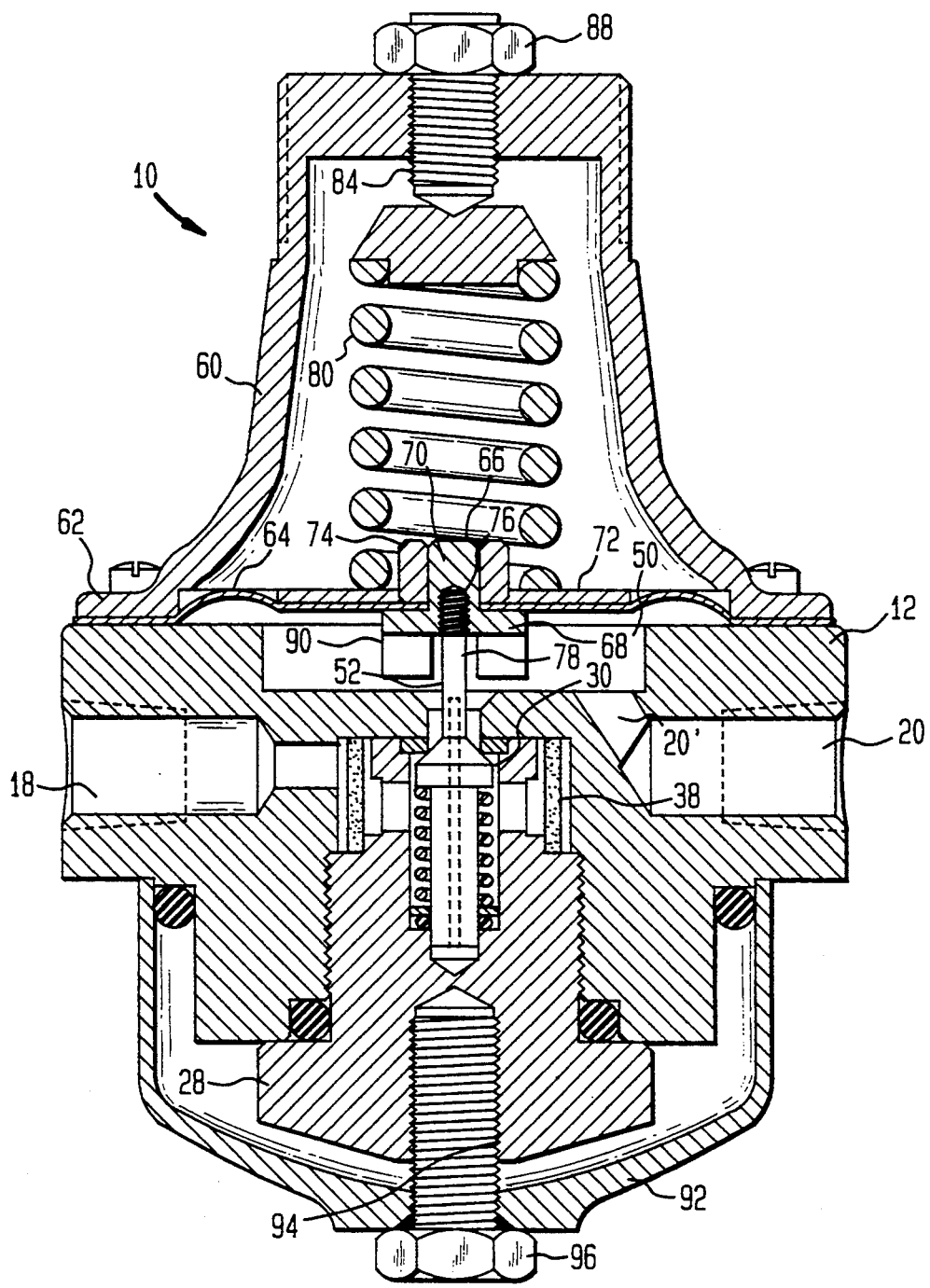
FIG. 3 is a cross-sectional view of the regulator of FIGS. 1 and 2, taken along section 3—3 of FIG. 1, the same being of substantially the same scale as FIG. 2.
Figure 5:
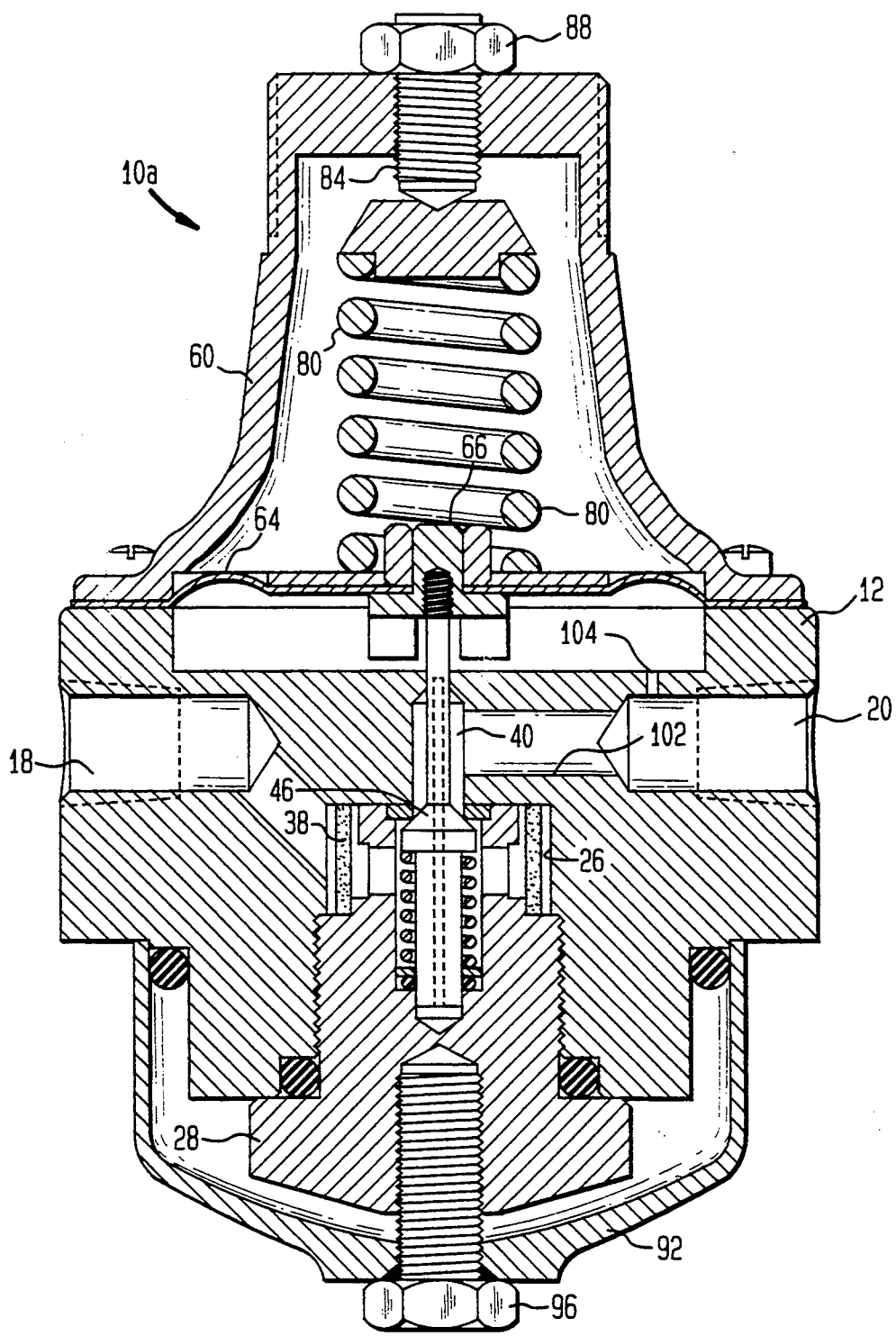
FIG. 5 is an illustration similar to that of FIG. 3, albeit of an alternative embodiment of the invention as disclosed in the prior applications.
Figure 6:
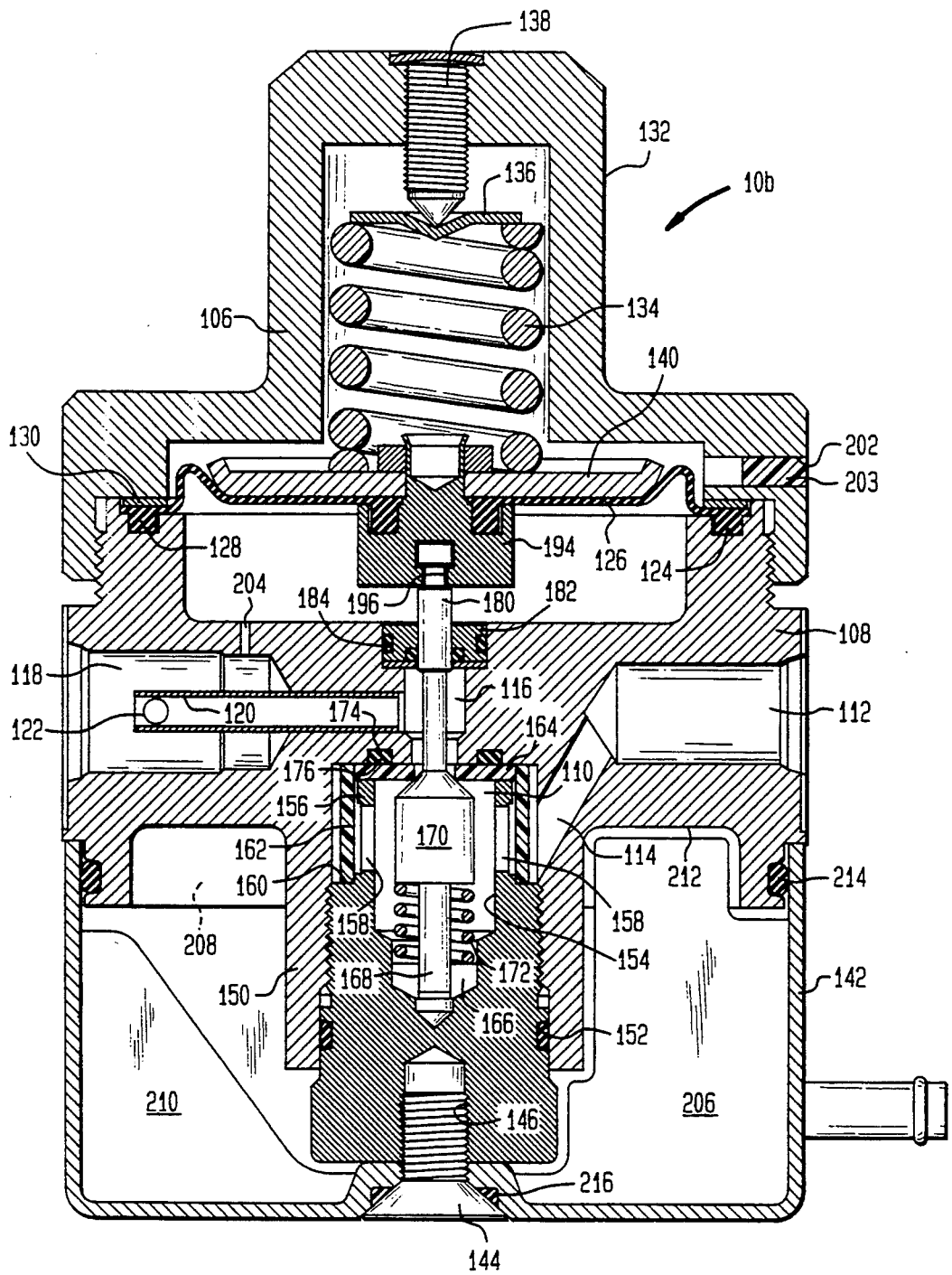
FIG. 6 is a cross-sectional view of the novel regulator, according to an embodiment thereof as set forth in this continuation-in-part application, which is similar to FIG. 5.
Figure 7:
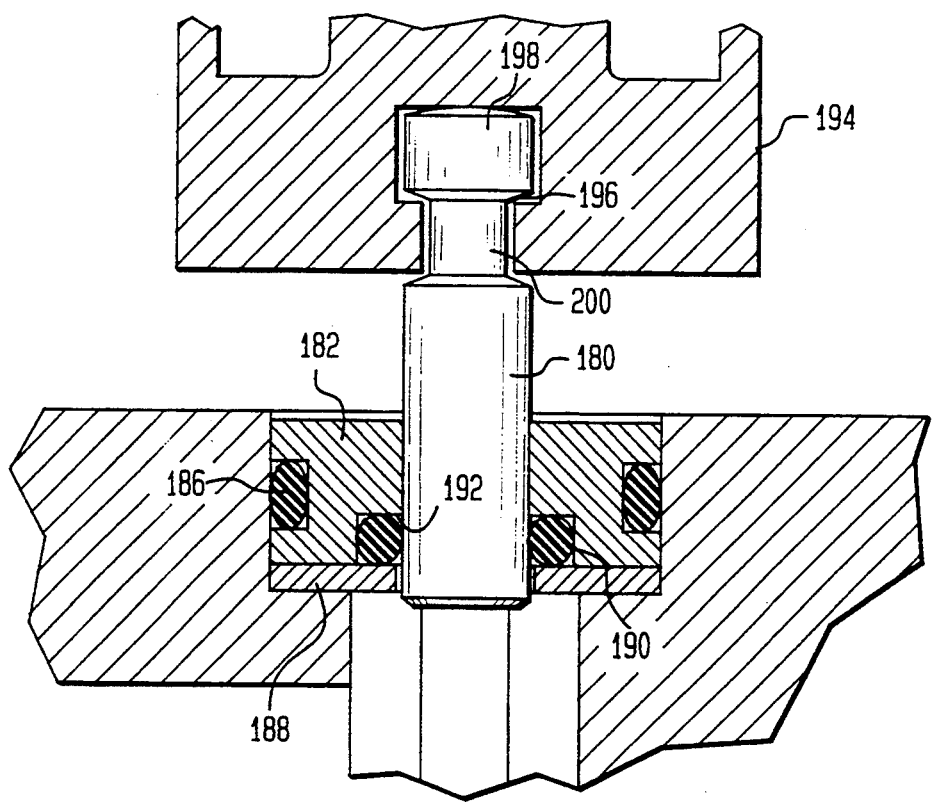
FIG. 7 is a greatly enlarged, cross-sectional detail of the structural relationship of the diaphragm insert, the plug guide and the valve stem, of the regulator of FIG. 6.

The alternative embodiment 10a of the invention, shown in FIG. 5, provides a communication for the gas flow directly to an outlet port, rather than having the gas work against the diaphragm, for advantages noted in the following. In FIG. 5, same or similar index numbers denote same or similar parts and/or components as those so-indexed in FIGS. 2 and 3.

In circumstances where there are high flow rates of the subject gas, there obtains the possibility of diaphragm 64 and diaphragm insert 66 oscillation or instability. Consequently, then, the momentum or force of the gas would endeavor to move the valving element 44 to a closed position. Embodiment 10a of FIG. 5 eliminates the aforenoted instability and closure of the valving element 44, by providing a passage 102 which directly communicates the void 26, i.e., the inner chamber, with the gas discharge port 20. Whereas port 20, in embodiment 10 had a large passage 20' opening onto the outer cheer, i.e., between the diaphragm 64 and the recess 50, it is replaced, in this embodiment 10a, with a droop correction or aspirator hole 104. The latter is provided to reduce the pressure drop which is associated with increasing flow rates. Too, with the provisioning of the passage 102, in bypass of the diaphragm 64, the groove 90 in the diaphragm insert 66 is not necessary in embodiment 10a; it can be omitted.

DESCRIPTION OF THE PREFERRED EMBODIMENT OF THIS CONTINUATION-IN-PART APPLICATION

With particular reference to the FIGS. 6 through 9, the preferred embodiment of this continuation-in-part application is described in the following text.

The regulator 10b comprises a housing 106 having a body 108. The body 108 has an inner cheer 110 for receiving high-pressure, compressed, natural gas therewithin from an inlet port 112 and a connecting passageway 114. Too, the body 108 has an outer chamber 116 for receiving low-pressure, compressed, natural gas therewithin. The outer chamber 116 is communicated with an outlet port 118 by means of a nozzle 120. It is to be noted that the port 118 extends into the body 108 for a given distance, and the nozzle 120 extends into the port 118 for substantially half the aforesaid distance. The nozzle 120 has two holes 122 (only one of which is visible) cross-drilled in adjacency to the outermost end thereof.

The uppermost surface of the body 108 has a circular groove 124 formed therein, and a diaphragm 126, with a peripheral rib 128 is set across the aforesaid uppermost surface. The rib 128 is nested in the groove 124. Too, a bearing ring 130 surmounts the periphery of the diaphragm 126. The housing 106 further has a bonnet 132 which is threadedly engaged with the body 108; the bonnet 132 clamps the bearing ring 130 firmly against the periphery of the diaphragm, and secures the rib 128 in the groove 124. Within the bonnet 132 is a compression spring 132. The spring 134 is engaged by a spring button 136 and an adjustment screw 138 at one end thereof, and bears against a diaphragm plate 140 at the opposite end thereof.

The housing 106, further, has a bowl 142 joined thereto, at the bottom thereof. The bottom center of the bowl 142 is apertured to receive a machine screw 144. The latter is threadedly received into a tapped hole 146 provided therefor in a valve body 148. The housing body 108 has a depending cylindrical sleeve 150 into which the valve body 148 is secured. A sealing O-ring 152 is interposed between the sleeve 150 and the valve body 148. The valve body 148 has a cylindrical cavity 154 formed therein, the same being rimmed and defined by an annular wall 156. The cavity comprises the inner chamber of the regulator 10b into which high-pressure, compressed, natural gas is received from port 112 and passageway 114. The wall 156 has apertures 158 formed therein, to permit gas flow from passage way 114 to enter the inner cheer defined by the cavity 154.

The valve body 148 has a peripheral land 160. Set upon that land 160 is a sintered plastic filter 162 of cylindrical configuration. The annular wall 156 is set against a compliant plastic valve seat 164. Fixed near the bottom termination of the cavity 154 is a bushing 166. Bushing 166 slidably receives the shank 168 of a poppet-type valving element 170. The latter has a tapered nose which closes upon and removes from the valve seat 164. A compression spring 172 is set between the valving element 170 and the bushing 166 to bias the nose against the valve seat 164. A circular groove 174, formed in the body surface which interfaces the valve seat 164, nests an O-ring seal 176.

The valving element 170 has a stem 178 projecting upwardly therefrom which penetrates the outer chamber 116. Stem 178 has a plug 180 integral therewith, and the plug 180 is slidably engaged with a plug guide 182. Guide 182 is set within a recess 184 formed therefor within the uppermost surface of the housing body 108. As can be seen with particular clarity in FIG. 7, the guide 182 has a peripheral groove 184 in which an O-ring 186 is nested. Further, a support washer 188 is set in the bottom of the recess 184. It retains another seal 190 which is set within an annular recess 192 provided therefor in the guide 182.

Figure 8:
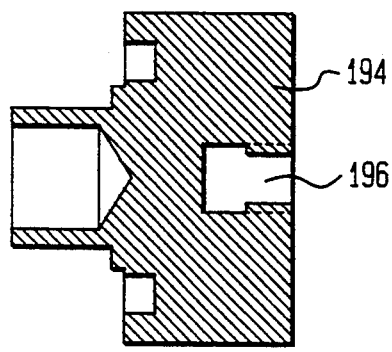
FIGS. 8 and 9 are cross-sectional, and bottom plan views, respectively, of the diaphragm insert.
Figure 9:
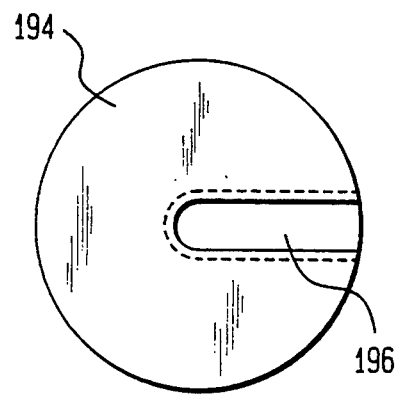

The diaphragm 126, in the center thereof, has an insert 194 captive thereat, the insert 194 has a dual-diameter slot 196 formed therein, and slot 196 receives the substantially button-like termination 198 of the plug 180. With reference to FIGS. 8 and 9, it can be seen that the slot 196 in the insert 194 permits the termination 198 to be slid thereinto. Too, as evidenced in FIG. 7, the termination 198 is domed at the end thereof, and tapered about the bottom thereof where it joins a neck 200. The diameters of the innermost portions of the slot 196, and those of the termination 198 and neck 200 are such as to accommodate an angular displacement between the insert 194 and the plug 180, without causing the plug 180 to jam or become cantedly stuck in the guide 182.

The bonnet 132 has a through hole 202 formed therein to provide an atmospheric pressure reference for the uppermost side of the diaphragm 126. However, the hole 202 has a porous plug 203, formed of polytetrafluoroethylene, set therein. The porosity of the plug 203 is sufficient to permit atmospheric pressure to enter the bonnet 132, but it fends off any intrusion of water, as from splash-up from puddles, wet roadways, or the like.

The housing body 108, in the uppermost surface thereof, has an aspiration hole 204 formed therein which opens into the port 118. It is considerably inboard of the end of the nozzle 120, being located intermediate the length of the nozzle. As explained in the ensuing text, this assures that the diaphragm will see a slightly lesser-pressure gas than that which discharges from the outer chamber 116.

The bowl substantially surrounds the valve body 148, and serves the same purpose as the bowl 92 disclosed in the prior patent applications. Vehicular coolant, for example, is admitted into the bowl 142 of this embodiment also, to prevent icing of the regulator 10b. However, to assure that the coolant does not bypass any portion of the bowl enclosed components, the coolant flow is positively controlled and directed. Baffles 206, 208, and 210 are fixed in the bowl 142 and uppermost ends thereof are received in splines 212 (only one of which is shown) formed therefor in the bottom of the housing body 108. Consequently, the coolant is forced in behind the baffle 206, around and behind the sleeve 150, to surmount the baffle 208 (not shown) to flow over the baffle 210.

Storage tank fuel pressure, typically from two hundred and fifty to thirty-six hundred psig, enters the inlet port 112 of the regulator 10b, and passes through the cylindrical, sintered plastic filter 162, into the high-pressure, inner chamber 110. This filter 162 is unique to fuel pressure regulators for several reasons. Unlike a metal filter element, no contaminants are generated when installed and replaced (due to a rough metal edge rubbing a metal mating surface), no contaminants are released from corrosion of the filter—the plastic element does not suffer from corrosion problems like a metal filter, and the forces, and associated material stress on pressure-containing components, are lower.

The high-pressure, inner chamber 110 is sealed from the low-pressure, outer chamber 116 by the conical valving element 170 contacting the inside diameter of the disk-shaped valve seat 164, and the valve seat 164, is secured to the housing body 108 by the valve body 148 while being sealed with a face seal O-ring 174 in the housing body 108. The popper design of the valving element 170 prevents shear or tensile forces from reducing the longevity of the compliant, plastic, valve seat 164. Other regulator designs rely on shear sealing of a polymer valve popper against a hard, metallic seat. The face O-ring 174 insures that gas does not creep around the valve seat 164 and prevent shutoff.

The popper plug 180, as noted, is connected to the diaphragm insert 194 by means of a slotted engagement. This slotted arrangement permits the aforesaid angular degree of freedom for the diaphragm 126 and plate 140, i.e., tipping and/or tilting, without cocking the valve plug 180.

In operation, the valving element 170 assumes a position which permits controlled gas flow between the high-pressure, inner chamber 110 and the low-pressure, outer cheer 116, via a gap between the conical portion of the valving element 170 and the compliant valve seat 164. The plug 180 is sealed by means of the brass, plug guide 182 and O-ring seals 186 and 190. This prevents the gas, flowing from the inlet to the outlet, from impinging upon the diaphragm 126. This arrangement comprises that which can be called one hundred percent flow bypass.

The benefits of one hundred percent flow bypass include preventing gas, which is supercooled upon rapid expansion, from chilling the material of the diaphragm 126 to a point of brittleness, improved pressure-flow characteristics, by eliminating the forces of gas momentum upon the pressure-sensing diaphragm 126, improved manufacturability, by permitting greater fit tolerance between the valve plug 180 and the plug guide 182, and being able to use an aspirator hole 204 to communicate the outlet pressure to the diaphragm 126. An earlier design incorporated flow bypass features and an aspirator hole (104, FIG. 5) to communicate the outlet pressure to the diaphragm. However, no sealing elements, such as elements 186 and 190 which are employed in this regulator 10b, were present to insure one hundred percent bypass. Without the sealing elements 186 and 190, varying rates of leakage at the plug guide 182 would pressurize the volume beneath the diaphragm 126 and, in turn, produce unacceptable output pressure variance from unit to unit.

The design of the low-pressure passages, 120 and 118, incorporate the ejector nozzle 120 to permit gas flow to enter the downstream connection at a given distance inside the fitting of port 118. This feature permits the nozzle 120 to act like a jet pump venturi, and results in artificially low pressure at the aspirator hole 204. This biased pressure is communicated to the diaphragm 126, and the diaphragm 126 "sees" pressures which are lower than actual outlet pressure and are a function of flow.

The lower pressure acting upon the diaphragm 126 results in the diaphragm moving downward under the force of the range spring 134, and permits the outlet pressure to increase under increased flow. This feature is novel for a fuel pressure regulator, and its benefit to a gaseous fuel system for a vehicle is that pressure loss within the delivery lines can be compensated for by the regulator 10b.

To provide the necessary force for the diaphragm 126 and plate 140 to move against the biased outlet pressure, and push the valving element 170 to an open position, the heavy range spring 134 is used. This spring 134 is compressed by means of the spring button 136 and load adjustment screw 138. To prevent unauthorized adjustment, the access to the screw 138 is sealed with a spherical expansion plug, i.e., a welsh freeze plug.

The screw-on bonnet 132 required less assembly time than a flanged design, and reduces the components required to secure the bonnet 132 to the housing body 108. The bonnet 132 screws on to the body 108 until it contacts a positive stop.

The diaphragm 126 is clamped to the body 108 by means of the bonnet 132 and the bearing ring 130. The ring 130 prevents the diaphragm 126 and plate 140 from turning with the bonnet 132 when the bonnet is installed. The bearing ring 132 works simply by friction; the static friction between the diaphragm to body interface, and the diaphragm 126 to bearing ring 130 interface is much higher than the friction between the bonnet 132 and bearing ring 130. Consequently, the diaphragm 126, plate 140 and bearing ring 130 stay still, relative to the body 108, while the bonnet is turned during installation.

The diaphragm 126 is designed with the pressure-enhanced sealing bead or rib 128. Differential pressure between the diaphragm chamber (beneath the diaphragm) and the interior of the bonnet 132 (i.e., atmospheric pressure) acts upon the bead or rib 128, and seals the diaphragm in much the same way as an O-ring face seal.

The anticipated, primary application of the regulator 10b (and 10, and 10a as well), as noted herein, is as a pressure reducer for high-pressure, compressed, natural gas-fueled vehicles. Other applications, however, can be found in controlled pressure reductions of compressed gases in industrial and research endeavors where additional heat input, to prevent moisture freezing or excessive cooling, is required.

While I have described my invention, in this continuation-in-part application, in connection with a specific embodiment thereof, it is to be clearly understood that this is done only by way of example, and not as a limitation to the scope of the invention, as set forth in the objects thereof and in the appended claims. For example, in lieu of the freeze plug, the adjustment screw 138 could be factory-set and sealed with a plug, an epoxy, or such, to render the regulator 10b tamper-proof. In addition, vehicular coolant need not be the only medium for heating the regulator 10b to prevent or inhibit icing thereof. Electrical heating could be used as well and, for employing the bowl 142, it would be most facile to connect an electrical heating element thereto and arrange electrical connectors therefor wherever most convenience and accessible. Such further features will suggest themselves to others, by taking teaching from my disclosure herein, and are deemed to be within the ambit of my invention, and embraced by the appended claims.

I claim:

1. A pressure-reducing regulator for compressed natural gas, comprising:

a regulator housing; wherein said housing has a body;

said body has (a) an inner chamber for receiving high-pressure, compressed natural gas therewithin, at a given pressure, and (b) an outer chamber for receiving low-pressure, compressed, natural gas therewithin, at a given low pressure;

first porting means for admitting gas into said inner chamber;

second porting means for discharging gas, at said given low pressure, from said outer chamber;

valving means, movably disposed within said body, for controlling gas flow between said chambers;

compliant means, coupled to said valving means, for (a) sensing gas pressure in one of said chambers, and (b) effecting movement of said valving means;

means for communicating said compliant means with said second porting means, and introducing gas pressure to said compliant means at less than said given low pressure;

said compliant means comprises a diaphragm and said housing further has a bonnet;

said bonnet is coupled to said body, and said diaphragm forms a wall between said body and said bonnet;

said body has an annular groove formed therein, in an outermost surface thereof;

said diaphragm has a periphery with a rib projecting therefrom, and said rib is nested in said groove; and a bearing ring overlies said periphery, and said bonnet clamps said ring to said periphery, and said rib into said groove.

2. A pressure-reducing regulator for compressed natural gas, comprising:

a regulator housing; wherein said housing has a body;

said body has (a) an inner chamber for receiving high-pressure, compressed, natural gas therewithin, and (b) an outer chamber for receiving low-pressure, compressed, natural gas therewithin;

first porting means for admitting gas into said inner chamber;

second porting means for discharging gas from said outer chamber;

valving means, movably disposed within said body, for controlling gas flow between said chambers;

compliant means, coupled to said valving means, for (a) sensing gas pressure in one of said chambers, and (b) effecting movement of said valving means;

said valving means and said compliant means have means cooperative for accommodating relative angular displacement therebetween;

means for communicating said compliant means with said second porting means, and introducing gas pressure to said compliant means at less than said given low pressure;

said compliant means includes a diaphragm; and said housing has a bonnet;

said bonnet is coupled to said body; and said diaphragm forms a wall between said body and said bonnet;

said housing further has a bowl coupled to, and depending from said housing body;

said bowl is fastened to said valve body; and said bowl substantially surrounds said valve body;

said bowl has baffles formed therein; and said housing body has splines formed therein which receive portions of said baffles therein.

3. A pressure-reducing regulator for compressed natural gas, comprising;

a regulator housing; wherein said housing has a body;

said body has (a) an inner chamber for receiving high-pressure, compressed, natural gas therewithin, and (b) an outer chamber for receiving low-pressure, compressed, natural gas therewithin;

first porting means for admitting gas into said inner chamber;

second porting means for discharging gas from said outer chamber;

valving means, movably disposed within said body, for controlling gas flow between said chambers;

compliant means, coupled to said valving means, for (a) sensing gas pressure in one of said chambers, and (b) effecting movement of said valving means;

non-metallic filtering means, interposed between said porting means, for filtering out particulate matter from inter-chamber gas flow;

said compliant means comprises a diaphragm, and said housing further has a bonnet;

said bonnet is coupled to said body, and said diaphragm forms a wall between said body and said bonnet;

said valving means comprises a poppet-type valving element, and a valve seat, and said valve seat comprises a juncture of said chambers;

said valving element has a stem which penetrates said outlet chamber, and said stem has means, extending therefrom, coupling said stem to said diaphragm;

said coupling means comprises a cylindrical plug;

said body has a circular recess formed therein, and an annular plug guide is set within said recess to accommodate movement of said plug guidably therethrough;

a washer is interposed between said plug guide and said body, said washer being bottomed in said recess; and a seal is interposed between said guide and said body, and another seal is interposed between said washer and said guide.

4. A pressure-reducing regulator for compressed natural gas, comprising:

a regulator housing, wherein said housing has a body;

said body has (a) an inner chamber for receiving high-pressure, compressed, natural gas therewithin, and (b) an outer chamber for receiving low-pressure, compressed, natural gas therewithin;

first porting means for admitting gas into said inner chamber;

second porting means for discharging gas from said outer chamber;

valving means, movably disposed within said body, for controlling gas flow between said chambers;

compliant means, coupled to said valving means, for (a) sensing gas pressure in one of said chambers, and (b) effecting movement of said valving means;

non-metallic filtering means, interposed between said porting means, for filtering out particulate matter from inter-chamber gas flow;

said compliant means comprises a diaphragm, and said housing further has a bonnet;

said bonnet is coupled to said body, and said diaphragm forms a wall between said body and said bonnet;

said valving means comprises a poppet-type valving element, and a valve seat, and said valve seat comprises a juncture of said chambers;

said valving element has a stem which penetrates said outlet chamber, and said stem has means, extending therefrom, coupling said stem to said diaphragm;

a valve body;

said housing body has a bore formed therein, and said valve body is confined within said bore;

said valve body has a cylindrical cavity formed therein in an end thereof, and said valving element is disposed in said cavity;

said cavity is rimmed by an annular wall, and said wall holds said valve seat against said housing body;

said cavity has a closed end, and a bushing is set within said closed end; and said valving element has a shank, and said shank is slidably engaged with said bushing.

5. A pressure-reducing regulator, according to claim 4, wherein:

said wall is apertured to permit fluid flow therethrough; and said cavity comprises said inner chamber.

6. A pressure-reducing regulator, according to claim 4 further including:

means interposed between said bushing and said valving element biasing said valving element against said valve seat.

7. A pressure-reducing regulator for compressed natural gas, comprising:

a regulator housing; wherein said housing has a body;

said body has (a) an inner chamber for receiving high-pressure, compressed, natural gas therewithin, and (b) an outer chamber for receiving low-pressure, compressed, natural gas therewithin;

first porting means for admitting gas into said inner chamber;

second porting means for discharging gas from said outer chamber;

valving means, movably disposed within said body, for controlling gas flow between said chambers;

compliant means, coupled to said valving means, for (a) sensing gas pressure in one of said chambers, and (b) effecting movement of said valving means;

non-metallic filtering means, interposed between said porting means, for filtering out particulate matter from inter-chamber gas flow;

said compliant means comprises a diaphragm, and said housing further has a bonnet;

said bonnet is coupled to said body, and said diaphragm forms a wall between said body and said bonnet;

said body has an annular groove formed therein, in an outermost surface thereof;

said diaphragm has a periphery with a rib projecting therefrom;

said rib is nested in said groove;

a bearing ring overlies said periphery; and said bonnet clamps said ring to said periphery, and said rib into said groove.

8. A pressure-reducing regulator for compressed natural gas, comprising:

a regulator housing, wherein said housing has a body;

said body has (a) an inner chamber for receiving high-pressure, compressed, natural gas therewithin, and (b) an outer chamber for receiving low-pressure, compressed, natural gas therewithin;

first porting means for admitting gas into said inner chamber;

second porting means for discharging gas from said outer chamber;

valving means, movably disposed within said body, for controlling gas flow between said chambers;

compliant means, coupled to said valving means, for (a) sensing gas pressure in one of said chambers, and (b) effecting movement of said valving means;

non-metallic filtering means, interposed between said porting means, for filtering out particulate matter from inter-chamber gas flow;

said compliant means comprises a diaphragm, and said housing further has a bonnet;

said bonnet is coupled to said body, and said diaphragm forms a wall between said body and said bonnet;

said valving means comprises a poppet-type valving element, and a valve seat, and said valve seat comprises a juncture of said chambers;

said valving element has a stem which penetrates said outlet chamber, and said stem has means, extending therefrom, coupling said stem to said diaphragm;

a valve body;

said housing body has a bore formed therein, and said valve body is confined within said bore;

said valve body has a cylindrical cavity formed therein in an end thereof, and said valving element is disposed in said cavity;

said cavity is rimmed by an annular wall, and said wall holds said valve seat against said housing body;

said cavity has a closed end, and a bushing is set within said closed end; and said valving element has a shank, and said shank is slidably engaged with said bushing;

said housing further has a bowl coupled to, and depending from said housing body;

said bowl is fastened to said valve body; and said bowl substantially surrounds said valve body.

9. A pressure-reducing regulator, according to claim 8, wherein:

said bowl has baffles formed therein; and said housing body has splines formed therein which receive portions of said baffles therein.

10. A pressure-reducing regulator for compressed natural gas, comprising:

a regulator housing; wherein said housing has a body;

said body has (a) an inner chamber for receiving high-pressure, compressed, natural gas therewithin, and (b) an outer chamber for receiving low-pressure, compressed, natural gas therewithin;

first porting means for admitting gas into said inner chamber;

second porting means for discharging gas from said outer chamber;

valving means, movably disposed within said body, for controlling gas flow between said chambers;

compliant means, coupled to said valving means, for (a) sensing gas pressure in one of said chambers, and (b) effecting movement of said valving means;

non-metallic filtering means, interposed between said porting means, for filtering out particulate matter from inter-chamber gas flow;

said compliant means includes a diaphragm, and said housing includes a bonnet;

said body has an annular groove formed therein, in an outermost surface thereof;

said diaphragm has a periphery with a rib projecting therefrom, and said rib is nested in said groove;

a bearing ring overlies said periphery, and said bonnet clamps said ring to said periphery, and said rib into said groove;

said second porting means comprises a port formed in said body, and a nozzle open at one end into communication with said outer chamber and open at the opposite end into said port; and said port extends into said body a given depth, from an outermost surface of said body to an innermost termination of said port; and said nozzle opposite end opens into said port intermediate said given depth thereof.

11. A pressure-reducing regulator, according to claim 10, wherein:

said nozzle has a given length and has holes cross-drilled in said opposite end thereof; and said body has an aspirator hole formed therein, intermediate said length of said nozzle, communicating said outer chamber with said compliant means.

* * * * *